United States Patent
Matsushima

(10) Patent No.: US 8,262,126 B2
(45) Date of Patent: Sep. 11, 2012

(54) AIR BAG APPARATUS FOR A VEHICLE

(75) Inventor: Hitoshi Matsushima, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 82 days.

(21) Appl. No.: 12/920,169

(22) PCT Filed: Feb. 9, 2009

(86) PCT No.: PCT/JP2009/052143
§ 371 (c)(1),
(2), (4) Date: Aug. 30, 2010

(87) PCT Pub. No.: WO2009/113349
PCT Pub. Date: Sep. 17, 2009

(65) Prior Publication Data
US 2010/0327566 A1    Dec. 30, 2010

(30) Foreign Application Priority Data
Mar. 12, 2008 (JP) .................................. 2008-062147

(51) Int. Cl.
*B60R 21/206* (2011.01)

(52) U.S. Cl. .................... 280/728.2; 280/730.1; 280/753

(58) Field of Classification Search .............. 280/728.2, 280/728.3, 730.1, 732, 753
See application file for complete search history.

(56) References Cited

U.S. PATENT DOCUMENTS

| | | | |
|---|---|---|---|
| 6,276,713 B1 * | 8/2001 | Duletzke | 280/732 |
| 6,536,802 B1 * | 3/2003 | Sutherland et al. | 280/752 |
| 6,705,638 B2 | 3/2004 | Abe et al. | |
| 7,175,195 B2 * | 2/2007 | Morita | 280/730.1 |
| 7,261,318 B2 | 8/2007 | Enders | |

(Continued)

FOREIGN PATENT DOCUMENTS

DE    42 09 604 C2    10/1992

(Continued)

OTHER PUBLICATIONS

Machine Translation of JP 2004-345416 A.*

(Continued)

*Primary Examiner* — Joseph Rocca
(74) *Attorney, Agent, or Firm* — Finnegan, Henderson, Farabow, Garrett & Dunner, LLP

(57) ABSTRACT

A casing 53 is coupled to an air bag door 40, and an air bag reaction force is loaded on the air bag door 40 via the casing 53. Since the general portion 42 of the air bag door 40 is fixed to the tear line outer portion 23 of the glove door outer member 20 at the cabin-side surface 42a and is fixed to the glove door inner member 30 at the opposite cabin-side surface 42b, the reaction force of the air bag loaded on the air bag door 40 can be borne by not only the fixing strength between the general portion 42 of the air bag door 40 and the tear line outer portion 23 of the glove door outer member 20 but also the glove door inner member 30 until the air bag 51 expands to break the tear portion 21. As a result, the fixing portion between the general portion 42 of the air bag door 40 and the tear line outer portion 23 of the glove door outer member 20 is prevented from being broken.

8 Claims, 4 Drawing Sheets

U.S. PATENT DOCUMENTS

| | | | |
|---|---|---|---|
| 7,878,532 B2 * | 2/2011 | Sasaki et al. | 280/730.1 |
| 2005/0104346 A1 * | 5/2005 | Suwama et al. | 280/732 |
| 2005/0253369 A1 | 11/2005 | Taoka | |

FOREIGN PATENT DOCUMENTS

| | | |
|---|---|---|
| EP | 1 262 379 | 12/2002 |
| JP | 2002-104124 | 4/2002 |
| JP | 2002-356137 | 12/2002 |
| JP | 2003-137054 | 5/2003 |
| JP | 2003-154918 | 5/2003 |
| JP | 2004-26126 | 1/2004 |
| JP | 2004-345416 | 12/2004 |
| JP | 2007-76393 | 3/2007 |
| JP | 2007-161090 | 6/2007 |
| JP | 2007-253719 | 10/2007 |

OTHER PUBLICATIONS

Notification of Reasons for Refusal, Japanese Patent Application No. 2008-062147, mailing date Apr. 27, 2010.

Extended European Search Report for EP Appl. No. 09720575.1 dated Nov. 21, 2011.

International Search Report in International Application No. PCT/JP2009/052143; Mailing date: May 19, 2009.

English-language translation of Reply filed in International Application No. PCT/JP2009/052143, responding to report mailed May 19, 2009.

* cited by examiner

[FIG. 1]
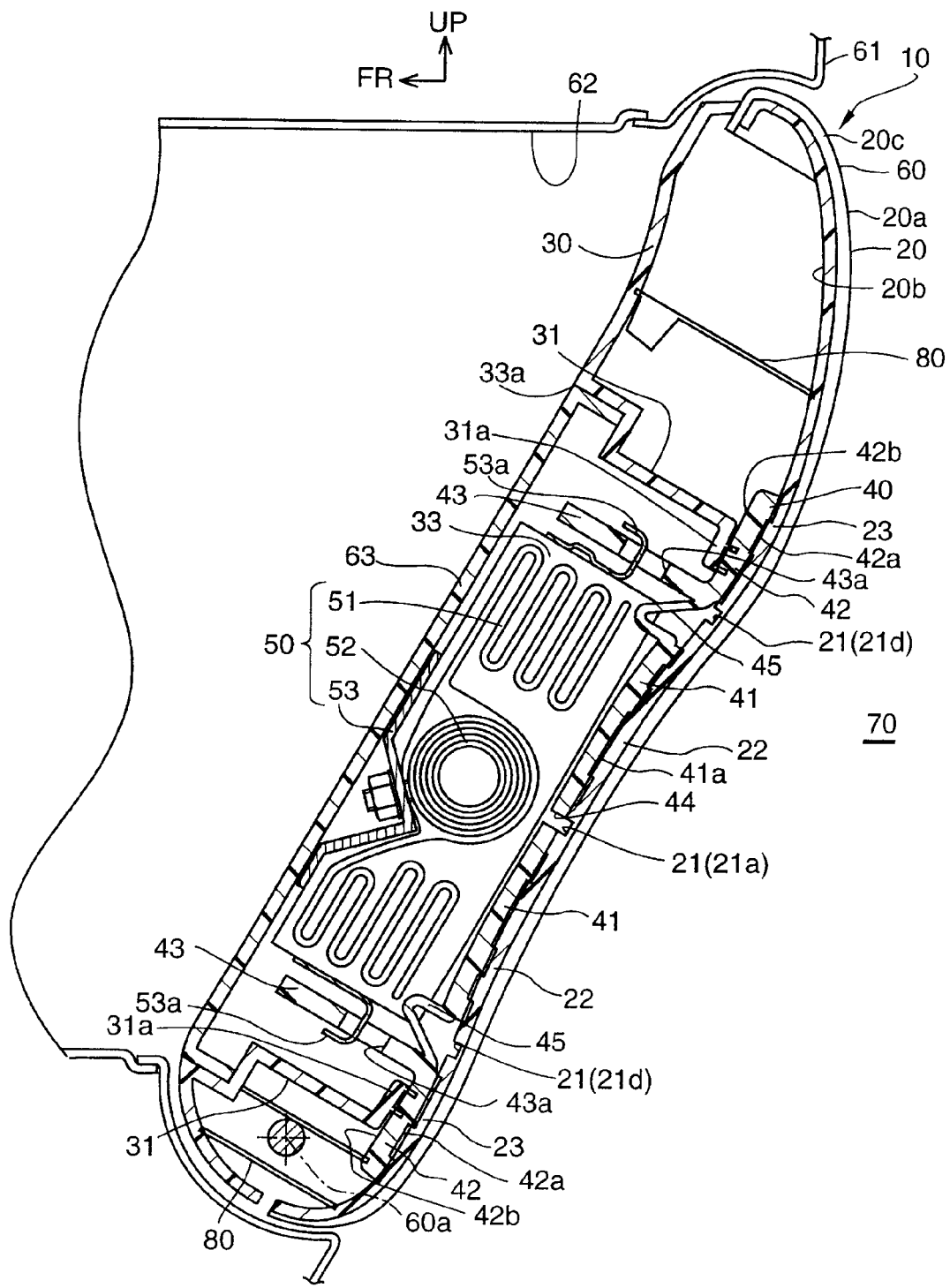

[FIG. 2]
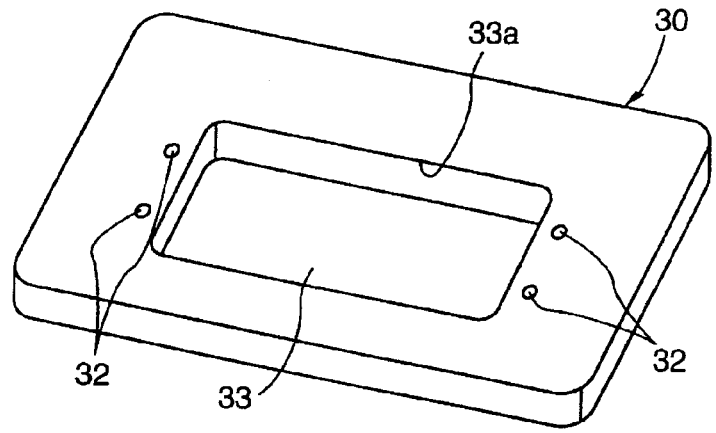
[FIG. 3]
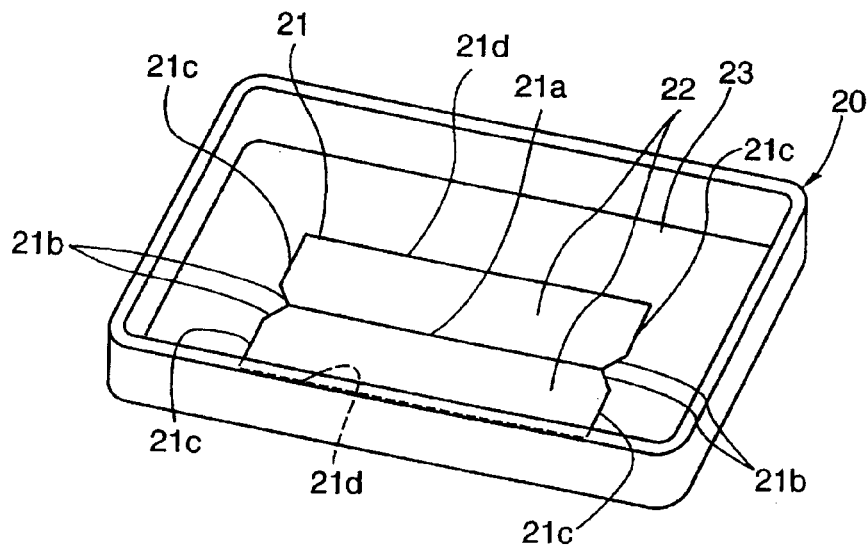
[FIG. 4]
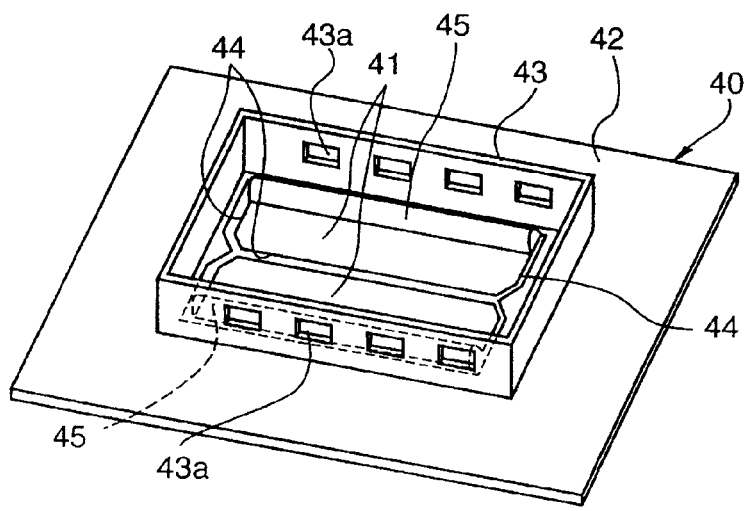

[FIG. 5]
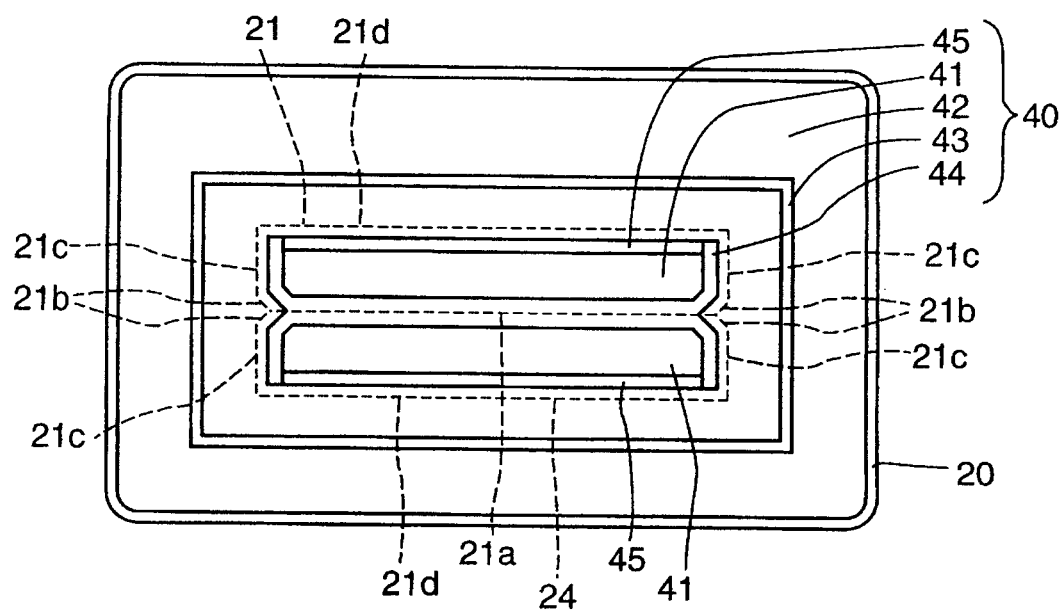

[FIG.6]
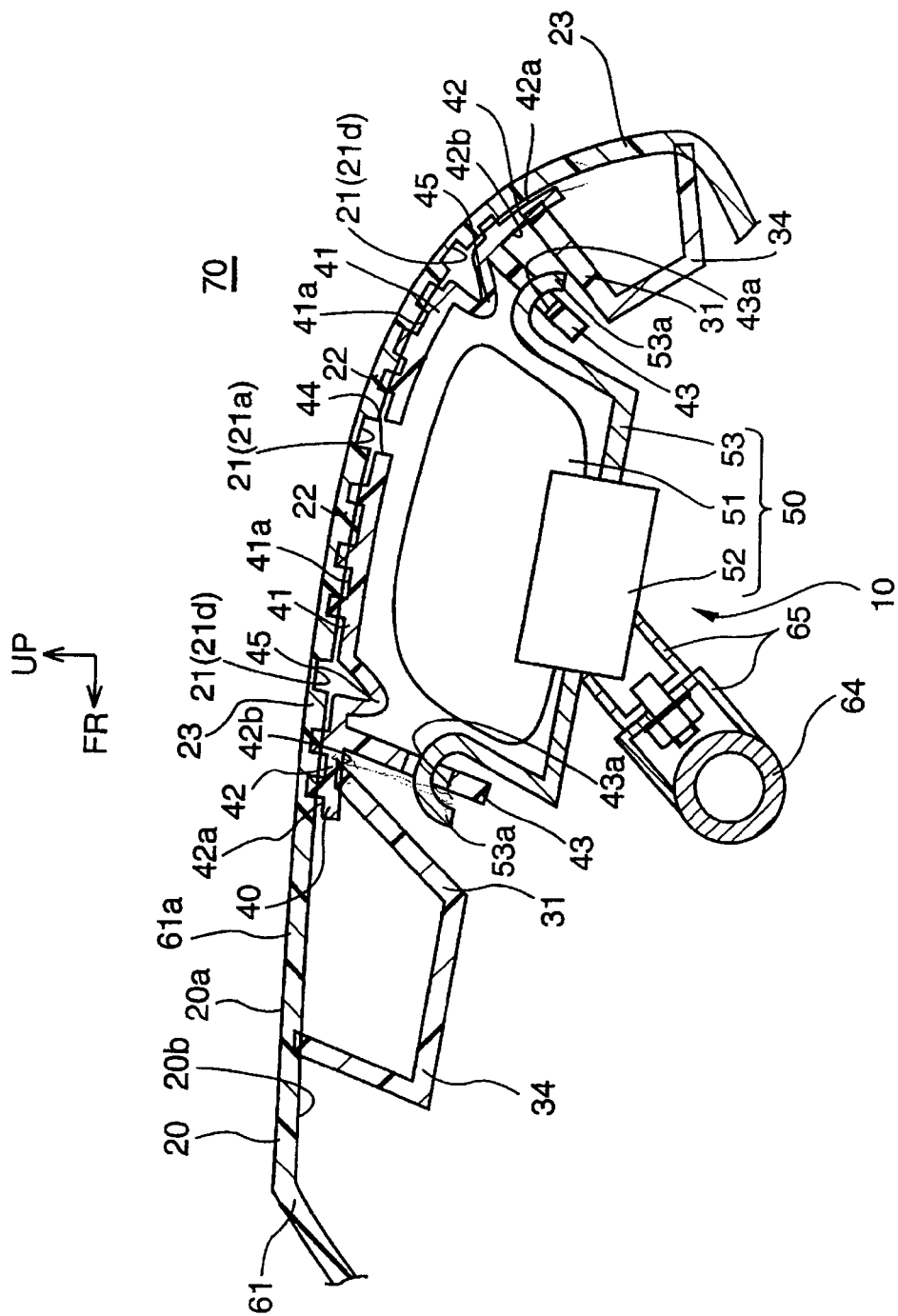

AIR BAG APPARATUS FOR A VEHICLE

CROSS-REFERENCE TO RELATED APPLICATIONS

This application is a national phase application of International Application No. PCT/JP2009/052143, filed Feb. 9, 2009, and claims the priority of Japanese Application No. 2008-062147, filed Mar. 12, 2008, the contents of both of which are incorporated herein by reference.

FIELD OF THE INVENTION

The present invention relates to an air bag apparatus for a vehicle such as a knee air bag apparatus installed at a glove door and an air bag apparatus for a passenger seat.

BACKGROUND OF THE INVENTION

Patent document 1 discloses an air bag apparatus for a vehicle which includes an outer member (a panel constructing member) having a cabin-side surface defining a design surface of a cabin, an air bag door (a frame) disposed on an opposite cabin-side of the outer member, and an air bag module having an air bag and a casing covering the air bag from the opposite cabin-side.

In the air bag module casing, a hook portion for engaging an aperture formed in the air bag door is provided so that a reaction force of an air bag caused when the air bag expands is supported by the air bag door via the casing.

A general portion (a flange portion) located outside a door portion, of the air bag door is welded to a tear line outer portion only which is located outside (outside in a direction along a surface of the outer member) the tear line portion of the outer member.

There is the following problem with the conventional air bag apparatus for a vehicle. Since the general portion of the air bag door is welded to the tear line outer portion of the outer member only, the reaction force of the air bag is held by a fixing strength (welding strength) only between the general portion of the air bag door and the tear line outer portion of the outer member, before the air bag expands and breaks the tear line portion of the outer member. As a result, if the fixing strength of the general portion of the air bag door with the tear line outer portion of the outer member is low, the general portion of the air bag door and the tear line outer portion of the outer member will be disconnected from each other. When the disconnection occurs, there is a risk that the tear line inner portion located inside (inside in the direction along the surface of the outer member) the tear line portion of the outer member does not open correctly.

Patent Document 1: Japanese Patent Publication 2007-76393
Patent Document 1: German Patent Application Laid-open 4209604

BRIEF SUMMARY

Problems to be Addressed by Certain Embodiments of the Invention

An object of certain embodiments of the present invention is to provide an air bag apparatus for a vehicle which can suppress disconnection between an air bag door and an outer member when the air bag expands, compared with the conventional air bag apparatus.

Means for Solving the Problems

An air bag apparatus for a vehicle according to certain embodiments of the present invention to achieve the above object is as follows:

(1) An air bag apparatus for a vehicle comprises:
an outer member having a cabin-side surface defining a design surface of a cabin;
an inner member disposed on an opposite cabin-side of the outer member and fixed to the outer member;
an air bag door disposed on the opposite cabin-side of the outer member; and
an air bag module having an air bag and a casing which covers the air bag from the opposite cabin-side,
wherein the outer member has a tear line where the outer member is broken when the air bag expands, a tear line inner portion located inside the tear line and opening when the tear line is broken and a tear line outer portion located outside the tear line portion, and
wherein the air bag door has a door portion which is fixed to the tear line inner portion of the outer member at a cabin-side surface of the air bag door and opens when the air bag expands and a general portion which is fixed to the tear line outer portion of the outer member at the cabin-side surface of the door portion and is fixed to the inner member at an opposite cabin-side surface of the air bag door, and
wherein the casing is coupled to the air bag door.

In item (1) above, the outer member corresponds to a glove door outer member in a first embodiment and to an instrument panel in a second embodiment. The inner member corresponds to a glove door inner member in the first embodiment and to a duct or a reinforcement member in the second embodiment. The air bag apparatus for a vehicle corresponds to a knee air bag apparatus installed at a glove door in the first embodiment and to a passenger seat air bag apparatus in the second embodiment.

(2) An air bag apparatus for a vehicle according to item (1) above, wherein the air bag apparatus is installed at a glove door of the vehicle,
wherein the glove door includes a glove door outer member having a cabin-side surface which defines a portion of the design surface of the cabin and a glove door inner member disposed on the opposite cabin-side of the glove door outer member, and
wherein the outer member is the glove door outer member of the glove door, and the inner member is the glove door inner member of the glove door.

(3) An air bag apparatus for a vehicle according to item (1) above, wherein the air bag apparatus is disposed at an instrument panel which is an interior member of the vehicle, and
wherein the outer member is the instrument panel, and the inner member is a duct fixed to the instrument panel or a reinforcing member for reinforcing the instrument panel.

(4) An air bag apparatus for a vehicle according to item (1) above, wherein the outer member and the inner member are fixed to each other by welding or fastening a rib formed in at least one of the outer member and the inner member to the other of the outer member and the inner member.

(5) An air bag apparatus for a vehicle according to item (1) above, wherein the general portion of the air bag door is sandwiched between the tear line outer portion of the outer member and the inner member.

(6) An air bag apparatus for a vehicle according to item (1) above, wherein the inner member has an extending portion which extends from the inner member toward the general portion of the air bag door, wherein the air bag door has a rising wall having a shape of a frame, which rises in an opposite cabin-side direction from the general portion, and wherein the general portion of the air bag door is fixed to an end portion in an extending direction, of the extending portion of the inner member at a portion of the air bag door located outside the frame-shaped rising wall.

(7) An air bag apparatus for a vehicle according to item (6) above, wherein the casing is coupled to the rising wall of the air bag door, and wherein the end portion in the extending direction, of the extending portion of the inner member has a second extending portion which is bent and extends in a direction toward the rising wall.

TECHNICAL ADVANTAGES

According to the air bag apparatus for a vehicle of items (1)-(7) above, the following technical advantages can be obtained:

Since the casing of the air bag module is coupled to the air bag door, the reaction force of the air bag is loaded on the air bag door via the casing when the air bag expands. Since the general portion of the air bag door is fixed to the tear line outer portion of the outer member at the cabin-side surface of the general portion and is fixed to the inner member at the opposite cabin-side surface of the general portion, the reaction force of the air bag loaded on the air bag door can be borne by not only the fixing portion between the general portion of the air bag door and the tear line outer portion of the outer member but also the inner member, until the air bag expands and breaks the tear portion of the outer member. As a result, the fixing portion between the general portion of the air bag door and the tear line outer portion of the outer member is prevented from being disengaged, unlike the (conventional) case where the general portion of the air bag door is fixed to the tear line outer portion of the outer member only and therefore, the reaction force of the air bag is borne by only the fixing portion between the general portion of the air bag door and the tear line outer portion of the outer member.

According to the air bag apparatus for a vehicle of item (2) above, the above-described technical advantages of the apparatus of item (1) above can be obtained even though the air bag apparatus for a vehicle is the knee air bag apparatus installed at the glove door.

According to the air bag apparatus for a vehicle of item (3) above, the above-described technical advantages of the apparatus of item (1) above can be obtained even though the air bag apparatus for a vehicle is the passenger seat air bag apparatus.

BRIEF DESCRIPTION OF THE DRAWINGS

Referring to the drawings, which form a part of this disclosure

FIG. 1 is a cross-sectional view of an air bag apparatus for a vehicle according to a first embodiment of the present invention;

FIG. 2 is a schematic perspective view of a glove door inner member as an inner member of the air bag apparatus for a vehicle according to the first embodiment of the present invention;

FIG. 3 is a schematic perspective view of a glove door outer member as an outer member of the air bag apparatus for a vehicle according to the first embodiment of the present invention;

FIG. 4 is a schematic perspective view of an air bag door of the air bag apparatus for a vehicle according to the first embodiment of the present invention;

FIG. 5 is a schematic front view of the outer member and the air bag door only, of the air bag apparatus for a vehicle according to the first embodiment of the present invention, when viewed from an opposite cabin-side; and FIG. 6 is a cross-sectional view of an air bag apparatus for a vehicle according to a second embodiment of the present invention, wherein an air bag which is folded is shown by a contour line only.

DETAILED DESCRIPTION

An air bag apparatus for a vehicle according to certain embodiments of the present invention will be explained below with reference to FIGS. 1-6.

FIGS. 1-5 illustrate an air bag apparatus according to a first embodiment of the present invention where the present invention is applied to a knee air bag apparatus installed at a glove door. FIG. 6 illustrates an air bag apparatus according to a second embodiment of the present invention where the present invention is applied to an air bag apparatus for a passenger seat. Portions common to embodiments of the present invention shown in the drawings are denoted with the same reference numerals throughout the drawings and the description herein. In the drawings, arrow "Fr" shows a front direction of a vehicle, and arrow "Up" shows an upward direction of the vehicle.

[The First Embodiment]

First, the glove door-installed air bag apparatus for a vehicle as the air bag apparatus for a vehicle according to the first embodiment of the present invention will be explained. The glove door-installed air bag apparatus for a vehicle (hereinafter, an air bag apparatus) 10 is an apparatus where a knee air bag module 50 is disposed within a glove door 60 of a vehicle. More particularly, as illustrated in FIG. 1, the air bag apparatus includes a glove door outer member 20 as an outer member, a glove door inner member 30 as an inner member, an air bag door 40 and an air bag module 50.

A surface 20a on a side of a cabin 70 (a cabin-side surface) of the glove door outer member 20 defines a part of a design surface of the cabin. The glove door outer member 20 is made from rigid synthetic resin, for example polypropylene (PP). The cabin-side surface 20a of the glove door outer member 20 may be provided with a surface sheet 20c in order to obtain a high-class design feeling. When provided with the surface sheet 20c, the cabin-side surface 20a of the glove door outer member 20 is defined by the cabin-side surface of the surface sheet 20c. The glove door outer member 20 includes a tear portion (a breakage line, a tear line) 21, a tear line inner portion 22 and a tear line outer portion 23.

The tear portion 21 is a portion where the door outer member breaks when an air bag 51 of the air bag module 50 expands. The tear portion 21 breaks due to an expansion pressure of the air bag 51 when the air bag 51 expands. The tear portion 21 is formed in, for example, a continuous notch (a portion formed small in thickness). The tear portion 21 is formed at an opposite cabin-side surface 20b of the glove door outer member 20 for the purpose of obtaining a good appearance when viewed from the cabin 70. The tear portion 21 may be formed by a forming die for forming the glove door outer member 20 or may be machined after die-forming the glove door outer member 20.

As illustrated in FIG. 3, the tear portion 21 includes a first line 21a which extends straight in a right and left direction of the vehicle at a vertically intermediate portion of the glove door outer member 20, a second line 21b which extends outwardly in a right and left direction from each of right and left ends of the first line 21a and extends in a forked manner straightly or curvedly, a third line 21c which extends vertically from an end of each second line 21b in a direction away from the second line 21b, and a fourth line 21d which extends in the right and left direction and connects ends of the right and left third lines 21c.

The tear line inner portion 22 is located inside (inside in a direction along a surface of the glove door outer member 20) the tear portion 21 in a front view of the air bag apparatus 10 (viewed from the side of the cabin) and opens toward the cabin pushed by the air bag 51 when the tear portion 21 is broken. The tear line inner portion 22 has a shape of a flat plate or a substantially flat plate.

The tear line outer portion 23 is located outside (outside in a direction along the surface of the glove door outer member 20) the tear portion 21 in the front view of the air bag apparatus 10 (viewed from the side of the cabin).

The glove door inner member 30 is made from the same material as that of the glove door outer member 20. As illustrated in FIG. 1, the glove door inner member 30 is disposed on the opposite cabin-side of the glove door outer member 20. The glove door outer member 20 and the glove door inner member 30 are fixed to each other by welding or fastening a rib 80 formed in at least one of the glove door inner member 20 and the glove door outer member 30 to the other of the glove door inner member 20 and the glove door outer member 30. In the embodiment shown in the drawings, the glove door inner member 20 and the glove door outer member 30 are welded (vibration-welded) to each other.

The glove door inner member 30 has an extending portion (rib) 31 which extends straight from the glove door inner member 30 toward the cabin 70 (i.e., toward the glove door outer member 20) and toward a general portion 42, which will be described later, of the air bag door 40. Two extending portions 31 are provided. One extending portion 31 is disposed above an upper rising wall 43, which will be described later, of the air bag door 40 and extends in the right and left direction of the vehicle, and the other extending portion 31 is disposed below a lower rising wall 43, which will be described later, of the air bag door 40 and extends in the right and left direction of the vehicle. The extending portion 31 may have a second extending portion 31a which is bent at an end of the extending portion 31 and extends in a direction toward the rising wall 43.

The air bag door 40 is disposed on an opposite cabin-side of the glove door outer member 20. The air bag door 40 is fixed to the glove door outer member 20 and the glove door inner member 30 by welding (vibration-welding) or fastening, etc. The air bag door 40 is manufactured in a manufacturing process independent of those of the glove door outer member 20 and the glove door inner member 30, and then is fixed to the glove door outer member 20 and the glove door inner member 30.

As illustrated in FIG. 4, the air bag door 40 includes a door portion 41, a general portion 42, a rising wall 43, a slit 44 and an integral hinge 45.

The door portion 41 is a portion located inside the slit 44 (in a direction along a surface of a portion of the air bag door 40 except the rising wall 43). As illustrated in FIG. 5, the door portion 41 is located inside the tear portion 21 of the glove door outer member 20 in the front view of the air bag apparatus 10. As illustrated in FIG. 1, the door portion 41 is substantially parallel to an opposite cabin-side surface of the tear line inner portion 22 of the glove door outer member 20. The door portion 41 can open toward the cabin 70, rotating and being deformed about the paired upper and lower integral hinges 45, when the vehicle receives a frontal impact and the air bag 51 expands. The door portion 41 is fixed to the opposite cabin-side surface of the tear line inner portion 22 of the glove door outer member 20 at a cabin-side surface 41a of the door portion 41 by welding (vibration-welding) or fastening, etc. Since the door portion 41 and the tear line inner portion 22 are fixed to each other, when the air bag expands 51, the door portion 41 and tear line inner portion 22 can open together toward the cabin 70 due to the expansion pressure of the air bag 51.

As illustrated in FIG. 4, the general portion 42 is located outside the slit 44 (in the direction along the surface of the portion of the air bag door 40 except the rising wall 43). The general portion 42 is connected to the door portion 41 via the paired upper and lower integral hinges 45. As illustrated in FIG. 1, the general portion 42 is substantially parallel to the opposite cabin-side surface of the tear line outer portion 23 of the glove door outer member 20. The general portion 42 is fixed to the opposite cabin-side surface of the tear line outer portion 23 at a cabin-side surface 42a of the general portion by welding (vibration-welding) or fastening, etc.

An opposite cabin-side surface 42b of the general portion 42 is fixed to an end (an end surface) of the extending portion 31 of the glove door inner member 30 by welding (vibration-welding) or fastening, etc. The opposite cabin-side surface 42b of the general portion 42 is fixed to the extending portion 31 of the glove door inner member 30 at a portion of the air bag door 40 located outside the rising wall 43 (outside in the direction along the surface of the portion of the air bag door 40 except the rising wall 43). Since the opposite cabin-side surface 42b of the general portion 42 is fixed to the extending portion 31 of the glove door inner member 30 at the portion of the air bag door 40 located outside the rising wall 43, the extending portion 31 does not adversely affect assembly of the air bag module 50 to the air bag door 40 and expansion of the air bag 51.

Since the cabin-side surface 42a of the general portion 42 is fixed to the tear line outer portion 23 of the glove door outer member 20 and the opposite cabin-side surface 42b of the general portion 42 is fixed to the extending portion 31 of the glove door inner member 30, the general portion 42 is disposed (sandwiched) between the glove door outer member 20 and the glove door inner member 30.

As illustrated in FIG. 4, the rising wall 43 rises from the general portion 42 toward an opposite cabin-side direction in a shape of a frame.

The slit 44 is positioned between the door portion 41 and the general portion 42. The slit 44 penetrates the air bag door 40. The slit 44 has substantially the same shape as the tear portion 21 excluding the fourth line 21d and has a shape of, substantially, letter "H" in the front view of the air bag apparatus 10.

The air bag door 40 is made from a flexible synthetic resin, for example, olefin elastomer (TPO, thermoplastic elastomer usually made by dispersing ethylene propylene diene rubber in PP), which is more flexible than the rigid synthetic resin which is the material of the glove door outer member 20 and the glove door inner member 30. This is because the flexible synthetic resin is an elastomer (elastic) not only at an ordinary temperature but also at an extremely low temperature (−30° C.) so that the integral hinge portion 45 can be deformed elastically and the door portion 41 can open at the extremely low temperature. Both of the TPO and the polypropylene which is the material of the glove door outer member 20 and the glove door inner member 30 are olefin, the air bag door 40 made from TPO can be welded to the glove door outer member 20 and the glove door inner member 30.

As illustrated in FIG. 1, the air bag module 50 includes an air bag 51, an inflator 52 and a casing (retainer) 53.

The air bag 51 pushes and opens the door portion 41 of the air bag door 40 and the tear line inner portion 22 of the glove door outer member 20 and expands to be developed into the cabin 70 thereby restraining a passenger, when the vehicle receives a frontal impact.

The inflator 52 is fixed (coupled) to the casing 53 by a bolt or caulking, etc. The inflator 52 supplies gas into the air bag 51 when a frontal collision occurs.

The casing 53 is made from metal (e.g., steel). However, the casing 53 may be made from material or materials other than metal, for example, a plurality of (e.g., two) members including a synthetic resin member and a metal member, or a plurality of (e.g., two) members including a cloth member and a metal member. The casing 53 covers the air bag 51 from an opposite cabin-side. The casing has a hook portion 53a. A plurality of hook portions 53a are formed. The casing 53a is coupled (installed) to the air bag door 40 by causing the hook portion 53a to engage with a hook engaging aperture 43a formed in portions (an upper wall portion and a lower wall portion) extending in the right and left direction of the vehicle, of the rising wall 43 of the air bag door 40.

The above-described structures may be applied to other embodiments of the present invention.

The first embodiment of the present invention further has the following structures:

The glove door 60 is a door of a glove box 62 of the vehicle. The glove door 60 is disposed at an instrument panel 61 in front of a passenger seat such that the glove door is rotatable in an up and down direction (i.e., capable of opening and closing an interior of the glove box 62) about a rotational axis 60a located at a lower end of the opening of the glove box 62. The rotational axis 60a may be inside or outside a cross section of the glove door 60. In the case where the rotational axis 60a is located outside the cross section of the glove door 60, by providing a bracket protruding outwardly from the glove door 60 and a rotational shaft penetrating through the bracket, the rotational axis 60a can be defined by an axis of the rotational shaft.

When the glove door 60 is closed, the glove door 60 is inclined toward the cabin 70 (rearward) in the upward direction so as to match a contour of the instrument panel 61.

At a central portion of the glove door inner member 30 in the up and down direction and in the right and left direction in the front view of the air bag apparatus 10, an air bag module housing space 33 (hereinafter, a housing space) for housing the air bag module 50 therein is provided. The housing space 33 is positioned in front of knees of a passenger such as an average-sized adult man (AM 50) when the passenger is seated on a passenger seat. The glove door inner member 30 includes an opening 33a that opens into the housing space 33 toward an opposite cabin-side, on the opposite cabin-side of (i.e., in front of) the housing space 33. If the housing space 33 was not covered, the housing space 33 might be seen when the glove door 60 is opened at an ordinary time (at a time when the air bag is not expanded), whereby an appearance of the glove door would be degraded. Preferably, a cover 63 is provided at the opening 33a in order to prevent the housing space 33 from being viewed when the glove door 60 is opened and to prevent goods housed in the glove box 62 from entering the housing space 33. At a circumference of the housing space 33, a bolt hole 32 shown in FIG. 2 is formed in the glove door inner member. The casing 53 of the air bag module 50 is coupled (fixed) to the glove door inner member 30 at the bolt hole 32 by a bolt or caulking, etc.

Effects and technical advantages of the first embodiment of the present invention will now be explained.

(a) Since the casing 53 of the air bag module 50 is coupled to the air bag door 40, a reaction force (a force in the opposite cabin-side direction) of the air bag 51 generated when the air bag 51 expands is loaded on the air bag door 40 via the casing 53 when the air bag 51 expands. Since the general portion 42 of the air bag door 40 is fixed to the tear line outer portion 23 of the glove door outer member 20 at the cabin-side surface 42a of the general portion 42 and is fixed to the extension portion 31 of the glove door inner member 30 at the opposite cabin-side surface 42b of the general portion 42, the reaction force of the air bag loaded on the air bag door 40 can be borne by not only the fixing strength between the general portion 42 of the air bag door 40 and the tear line outer portion 23 of the glove door outer member 20 but also the glove door inner member 30 until the air bag 51 expands to break the tear portion 21 of the glove door outer member 20. As a result, the air bag reaction force loaded on the air bag door 40 can be transmitted to substantially all portions of the air bag apparatus 10 except the air bag module 50. Therefore, the fixing portion between the general portion 42 of the air bag door 40 and the tear line outer portion 23 of the glove door outer member 20 is prevented from being broken, unlike the (conventional) case where the general portion of the air bag door is fixed to the tear line outer portion of the glove door outer member only and therefore, the reaction force of the air bag is borne by only the fixing strength between the general portion of the air bag door and the tear line outer portion of the glove door outer member.

(b) Since the tear portion 21 of the glove door outer member 20 is located outside the door portion 43 of the air bag door 40 (around the door portion 43) in the front view of the air bag apparatus 10, when the vehicle receives a frontal impact and the air bag 51 expands to open the door portion 41 of the air bag door 40 and the tear line inner portion 22 of the glove door outer member 20, the air bag 51 is prevented from interfering with the tear line outer portion 23 of the glove door outer member 51.

(c) Since the tear portion 21 has the second line 21b, when the air bag 51 expands and the tear portion 21 begins breakage at the first line 21a, the breakage can be smoothly transmitted (can run) from the first line 21a to the third line 21c, compared with a case where the tear portion does not have the second line 21b (e.g., a case where the first line 21a and the third line 21c cross with respect to each other at a right angle). As a result, the tear line inner portion 22 can be opened more quickly, compared with the case where the tear portion does not have the second line 21b.

(d) Since the tear portion 21 has the second line 21b, when the tear line inner portion 22 of the glove door outer member 20 opens and the air bag 51 expands, a portion inside a corner defined between the first line 21a and the third line 21c (a corner portion located at an opening end and at opposite ends in the right and left direction, of the tear line inner portion 22) will not injure a passenger when impacting with the passenger, compared with the case where the tear portion does not have the second line 21b. The above-described effects and technical advantages may be applied to other embodiments of the present invention.

The following effects and technical advantages will be further obtained in the first embodiment of the present invention:

Even though the air bag apparatus 10 is a knee air bag apparatus installed at the glove door, the above (a)-(d) effects and technical advantages can be obtained.

Since the opening 33a is provided in front of the housing space 33 of the glove door inner member 30, the air bag module 50 can be inserted into and housed in the housing space 33 through the opening 33a. Therefore, the air bag module 50 can be installed at the glove door 60, even after the glove door 60 has been manufactured by welding (fixing) the glove door outer member 20, the glove door inner member 30 and air bag door 40 to each other. As a result, a manufacturing process of the glove door 60 and a manufacturing process of the air bag module 50 can be independent to each other so that the glove door 60 and the air bag module 50 can be manufactured by different parts manufactures and a freedom of the manufacturing process is improved.

[The Second Embodiment]

Next, the glove door-installed air bag apparatus for a vehicle as the air bag apparatus for a passenger seat according to the second embodiment of the present invention will be explained with reference to FIG. 6.

The air bag apparatus for a passenger seat 10 is an apparatus where the air bag module 50 is disposed at the instrument panel 61. The air bag module 50 is disposed at a rear end or a vicinity thereof, of a portion 61a of the instrument panel 61 which extends substantially horizontally (more particularly, extends rearward inclining slightly downward) from a lower end of a front window (not shown).

The structures, effects and technical advantages which are applicable to other embodiments of the present invention, among those applicable to the first embodiment of the present invention, may be also applicable to the second embodiment of the present invention. In the second embodiment of the present invention, 2, "the knee air bag apparatus installed at the glove door 60", "the glove door outer member 20" and "the glove door inner member 30" correspond to "a passenger seat air bag apparatus disposed to the portion 61 of the instrument panel which is as an interior member of the vehicle", "an instrument panel 61" and "a duct or a reinforcement member 34 for reinforcing the instrument panel 61", respectively.

The duct or the reinforcement member 34 as the inner member is (i) the duct (see FIG. 6) extending in the right and left direction of the vehicle and used for preventing the front window (not shown) from fogging, or (ii) the reinforcement member (e.g., a rib (not shown), etc.) for reinforcing the instrument panel 61.

The duct or the reinforcement member 34 is made from synthetic resin. In the case where the duct or the reinforcement member 34 is the duct, a cross-sectional shape thereof may be of a letter "U" or a polygon other than the letter "U" which opens toward the cabin 70, or a polygon such as a triangle, a rectangle, or a pentagon, etc., which does not open in any direction. In the embodiment shown, the cross-sectional shape is of the letter "U" opening toward the cabin 70.

In the case where the duct or the reinforcement member 34 is the duct and the cross-sectional shape thereof is of a letter "U" or a polygon other than the letter "U" which opens toward the cabin 70, opening ends of the duct are fixed to the instrument panel 61 as the outer member and the general portion 42 of the air bag door 40 from the opposite cabin-side by welding (vibration-welding, etc.) In the case where the duct or the reinforcement member 34 is the duct and the cross-sectional shape thereof is of polygon which does not open in any direction, the duct is fixed to the instrument panel 61 and the general portion 42 of the air bag door 40 from the opposite cabin-side by welding (vibration-welding, etc.)

In the case where the duct or the reinforcement member 34 is the duct, the extending portion 31 is defined by a portion of the wall of the duct which extends from the portion fixed to the general portion 42 of the air bag door 40 toward the opposite cabin-side.

The casing 53 of the air bag module 50 is fixed, via a bracket 65, to an instrument panel reinforcement 64 which extends in the right and left direction of the vehicle and to which the instrument panel 61 is fixed.

In the second embodiment of the present invention, the following effects and technical advantages are obtained:

With the air bag apparatus 10, when a frontal impact is detected and the inflator 52 operates, the air bag 51 expands and breaks the tear portion 21 of the instrument panel 61. As a result, the door portion 41 of the air bag door 40 opens toward the cabin 70 to form an opening, and the air bag 51 is spread through the opening into the cabin 70 to restrict an upper half portion of the passenger.

When the air bag 51 expands, the reaction force of the air bag (the force operating toward the opposite cabin-side) is loaded on the air bag door 40 via the casing 53.

Since the general portion 42 of the air bag door 40 is fixed to the tear line outer portion 23 of the instrument panel 61 at the cabin-side surface 42a of the general portion 42 and is fixed to the duct or the reinforcement member 34 at the opposite cabin-side surface 42b of the general portion 42, the reaction force of the air bag loaded on the air bag door 40 can be borne by not only the fixing strength between the general portion 42 of the air bag door 40 and the tear line outer portion 23 of the instrument panel 61 but also the duct or the reinforcement member 34 until the air bag 51 expands to break the tear portion 21 of the instrument panel 61.

Therefore, the fixing portion between the general portion 42 of the air bag door 40 and the tear line outer portion 23 of the instrument panel 61 is prevented from being broken, unlike the (conventional) case where the general portion of the air bag door is fixed to the tear line outer portion of the instrument panel only and therefore, the reaction force of the air bag is borne by only the fixing strength between the general portion of the air bag door and the tear line outer portion of the instrument panel.

Further, the above-described effects and technical advantages of the items (b)-(d) above can be expected even though the air bag apparatus for a vehicle is the passenger seat air bag apparatus.

Explanation of Reference Numerals 10 an air bag apparatus
20 a glove door outer member (an outer member)
20a a cabin-side surface of the glove door outer member
20b an opposite cabin-side surface of the glove door outer member
21 a tear portion
21a a first line
21b a second line
21c a third line
21d a fourth line
22 a tear line inner portion
23 a tear line outer portion
30 a glove door inner member (an inner member)
31 an extending portion
31a a second extending portion
33 an air bag module housing space
33a an opening of the air bag module housing space
34 a duct or a reinforcement member (an inner member)
40 an air bag door 41 a door portion
41a a cabin-side surface of the door portion
42 a general portion
42a a cabin-side surface of the general portion
42b an opposite cabin-side surface of the general portion
43 a rising wall
43a a hook engaging aperture
44 a slit
45 an integral hinge
50 an air bag
52 an inflator
53 a casing
53a a hook portion
60 a glove door
61 an instrument panel (an outer member)
62 a glove box
63 a cover
64 an instrument panel reinforcement
65 a bracket
70 a cabin
80 a rib

The invention claimed is:

1. An air bag apparatus for a vehicle comprising:
an outer member having a cabin-side surface defining a design surface of a cabin;
an inner member disposed on a side that is opposite from the cabin-side surface of the outer member and fixed to the outer member;
an air bag door disposed on the side that is opposite from the cabin-side surface of the outer member; and
an air bag module having an air bag and a casing which covers the air bag from a side that is opposite from the cabin-side surface,
wherein the outer member has a tear line where the outer member is broken when the air bag expands, a tear line inner portion located inside the tear line and opening when the tear line is broken and a tear line outer portion located outside the tear line portion, and
wherein the air bag door has a door portion which is fixed to the tear line inner portion of the outer member at a cabin-side surface of the door portion and opens when the air bag expands and a general portion which is fixed to the tear line outer portion of the outer member at a cabin-side surface of the general portion and is fixed to the inner member at a side that is opposite from the cabin-side surface of the general portion,
wherein the casing is coupled to the air bag door,
wherein the inner member has an extending portion which extends from the inner member toward the general portion of the air bag door,
wherein the air bag door has a rising wall having a shape in a form of a frame, which rises in a direction that is opposite from the cabin-side from the general portion,
wherein the general portion of the air bag door is fixed to an end portion in an extending direction, of the extending portion of the inner member at a portion of the air bag door located outside the frame-shaped rising wall; and
wherein a cover is located behind the casing and arranged at an opening formed by the inner member.

2. An air bag apparatus for a vehicle according to claim 1, wherein the air bag apparatus is installed at a glove door of the vehicle,
wherein the glove door includes a glove door outer member having a cabin-side surface which defines a portion of the design surface of the cabin and a glove door inner member disposed on a side that is opposite from the cabin-side surface of the glove door outer member, and
wherein the outer member is the glove door outer member of the glove door, and the inner member is the glove door inner member of the glove door.

3. An air bag apparatus for a vehicle according to claim 1, wherein the air bag apparatus is disposed at an instrument panel which is an interior member of the vehicle, and
wherein the outer member is the instrument panel, and the inner member is a duct fixed to the instrument panel or a reinforcing member for reinforcing the instrument panel.

4. An air bag apparatus for a vehicle according to claim 1, wherein the outer member and the inner member are fixed to each other by welding or fastening a rib formed in at least one of the outer member and the inner member to the other of the outer member and the inner member.

5. An air bag apparatus for a vehicle according to claim 1, wherein the general portion of the air bag door is sandwiched between the tear line outer portion of the outer member and the inner member.

6. An air bag apparatus for a vehicle according to claim 1, wherein the casing is coupled to the rising wall of the air bag door, and
wherein the end portion in the extending direction, of the extending portion of the inner member has a second extending portion which is bent and extends in a direction toward the rising wall.

7. An air bag apparatus for a vehicle according to claim 1, wherein the air bag door includes a pair of upper and lower integral hinges, and the door portion and the general portion of the air bag door are connected by the pair of upper and lower integral hinges,
wherein the casing has a hook portion, and the rising wall of the air bag door includes an upper wall portion and a lower wall portion each extending in a right and left direction of the vehicle, in each of the upper and lower wall portion a hook engaging aperture being formed, the casing being coupled to the air bag door by causing the hook portion to engage with the hook engaging aperture, and
wherein the general portion of the air bag door includes a first portion located upper than the upper wall portion and a second portion located lower than the lower wall portion and is fixed to the inner member at the first and second portions.

8. An air bag apparatus for a vehicle according to claim 1, wherein the general portion of the air bag door is welded to the tear line outer portion of the outer member at the cabin-side surface of the general portion and is welded to the inner member at the side that is opposite from the cabin-side surface of the general portion.

* * * * *